United States Patent

Bachner et al.

[15] 3,636,243

[45] Jan. 18, 1972

[54] LONG-DISTANCE COMMUNICATION DIAL EXCHANGE INSTALLATION WITH CENTRAL CONTROL

[72] Inventors: Alfred Bachner, Olching; Karl Schneider, Krailling; Martin Ertel, Munich; Erika Schraml, Munich, all of Germany

[73] Assignee: Siemens Aktiengesellschaft, Berlin and Munich, Germany

[22] Filed: June 9, 1969

[21] Appl. No.: 831,309

[30] Foreign Application Priority Data

June 11, 1968 Germany ......................P 17 62 405.4

[52] U.S. Cl. ..............................................178/3, 179/18 AB
[51] Int. Cl. ..........................................................H04l 11/00
[58] Field of Search ...............................178/3, 2; 179/18 AB

[56] References Cited

UNITED STATES PATENTS

| | | | |
|---|---|---|---|
| 3,406,258 | 10/1968 | Peeters et al. | 179/18 AB |
| 3,251,929 | 5/1966 | Kafitz | 178/2 |
| 3,210,478 | 10/1965 | Klees et al. | 179/18 AB |
| 3,007,998 | 11/1961 | Grosser et al. | 178/2 |
| 2,694,752 | 11/1954 | Wright et al. | 179/18 AB |

*Primary Examiner*—Kathleen H. Claffy
*Assistant Examiner*—Thomas W. Brown
*Attorney*—Birch, Swindler, McKie & Beckett

[57] ABSTRACT

A long-distance communication teletype dial exchange installation wherein the establishment of the connection is centrally controlled. A plurality of line grouping units or exchange installations (GE), each having a through-connection network (WN), connection establishment systems, and a control unit, the lines of the plurality of grouping units being connected thereto in even distribution, are provided. Each control unit, operating independent from the control units of other exchanges, is operative to connect through the lines assigned to it over multiple lines (VL) between the through-connection networks and all receiving lines of every other exchange. At least one coordinating circuit (K) prevents the multiple seizure of outgoing lines and determines the succession sequence during testing for the seizure state of receiver lines by several simultaneously requesting control units.

10 Claims, 4 Drawing Figures

LONG-DISTANCE COMMUNICATION DIAL EXCHANGE INSTALLATION WITH CENTRAL CONTROL

BACKGROUND OF THE INVENTION

1. Field of the Invention

The invention concerns a long distance communication dial exchange installation, in particular a teletypewriter dial exchange installations, wherein the establishment of connections is centrally controlled.

2. Description of the Prior Art

Dial exchange systems with central control have been known for some time. The program for the connection establishment in such systems can in principle be divided into three segments: (1) connection of the registers, (2) dial evaluation, and (3) switching through of the paths in the path network. Accordingly a control system can be provided for each of these program segments wherein in each case only one control process can take place at a specific time. The devices used to accomplish each of these processes are known, but an exemplary description of them may be found in an article entitled "Performance Characteristics, Design and Special Features of the Automatic Teleprinter Exchange TWKD" in the *Siemens Review*, Volume 35 (1968), No. 8. Similar exchange processes are processed in time succession. Therefore the capability of the central control depends on its operational speed. This must be adapted to the control process used, the number of the connectable lines and the layout of the path network.

Often there are already available exchange office components, called grouping units hereafter which in their order of magnitude correspond, for example, to main exchange offices. The relatively low connection number of such grouping units permits the use of a relatively slow circuit elements such as ESK (noble metal contact) relays within the central control. However to offices as they exist, for example, on the central exchange office level of a network, a considerably larger number of lines often must be connected. In this instance not only an enlargement of the through-connection network, but also the development of a central control with higher operational speed would be necessary. However, if possible, the corresponding increased cost is sought to be avoided. It would be of advantage if in the construction of large exchange installations the already available techniques could be used.

SUMMARY OF THE INVENTION

The invention has the task to develop large exchange installations of several small grouping units without a considerable loss in the traffic capacity of the entire installation as compared to the traffic capacity of an individual grouping unit.

This object is achieved according to the invention through the fact that several grouping units, in each case containing a through-connection network and the systems necessary for connection establishment as well as the control unit are provided, to which the lines of each group are connected in even distribution. Through each control unit operating independent from the control units of other grouping units, each of the thereto assigned lines can also be switched through over multiple lines between the through-connection networks to all accepting lines of every other grouping unit. One or more coordination circuits are provided to prevent multiple seizures of departing lines, and these determine the succession in the examination of the seizure condition of accepting lines by several simultaneously requesting control units. The term control unit, as used herein, is to be defined as a device which includes the combination of means necessary to perform the three operations described hereinabove for connection establishment.

It would also be possible to use several grouping units that operate completely independent from one another. In this case, the lines of all groups would also have to be distributed evenly onto the grouping units. However the consequence of the subdivision of the groups in the outgoing direction would be a decrease in traffic capacity, as more traffic can be carried out over one large group than over several smaller ones with the same total number of lines. Therefore in the exchange installation according to the invention each grouping unit can have at its disposal all lines which pertain to other grouping units. A further possibility to develop a large exchange installation of several grouping units resides is to use the control units of the individual grouping units, but to replace the individual through-connection networks by one single large grouping. Then all lines connected to the exchange would have to be conveyed to each control unit. The exchange processes proceeding in the different control units would have to be coordinated by a complicated control coordinator.

In contrast, in the circuit arrangement according to the invention, the control units work parallel and almost independently of one another. The connection of registers, the marking of the transmission route, the path finding in the network, and the selection of the outgoing lines take place completely independent from one another. Only in hunting an outgoing line can double-seizure occur. This is prevented in that controls which simultaneously report to the coordinating circuit are only admitted for hunting in time succession. As the hunting time is only very short—a slight fraction of the time needed for an entire path finding cycle—and a coincidence of several controls is rare in this phase, the load on the controls for setting of the paths increases only inconsiderably.

The invention permits a continuous development of small network junctions up to a large exchange office which is composed of several grouping units. This development possibility is guaranteed through the fact that no matter how large the exchange office, the same control principles can be employed. The load on the control units in combined installations is thereby not heavier than in the case of the control unit of a single grouping unit. Moreover, due to the development of the exchange office of several extensively independent grouping units, it is guaranteed that even upon the failure of an entire grouping unit, the remaining units are not affected. Further, it is also easily possible that in case of failure of one control unit, the control unit of another grouping unit takes over the tasks of the failing unit. Thus the failing of one control unit results only in an increase of the load of another control unit. The combined installation further offers all possibilities, be it with regard to speed of telegraphy, dial process, subscriber classification, signaling or traffic capacity—which each individual grouping unit also possesses.

If the through-connection networks of the grouping units are realized through switching matrices, the coupling multiples of the coupling stages connected with the accepting lines of each through-connection network are enlarged in such a way that the number of coupling points per coupling multiple, or of outputs per multiple, is increased by the factor $n$ upon the connecting of $n$ grouping units. Corresponding outlets of the through-connection networks are then connected over multiple-lines. The number of outputs of the through-connection network is thereby increased in such a way that each line can be reached by all grouping units.

A further advantageous working example of the invention is characterized by the fact that upon the development of the through-connection networks as switching matrices with reversal-grouping, the multiples of the coupling stages of each through-connection network, directly connected with the lines, are enlarged in such a way that the number of coupling points per coupling multiple, or connections per coupling multiple, is increased by the factor $n$ upon the connection of $n$ grouping units, and that corresponding connections of the through-connection networks are connected over multiple-lines.

A further advantageous working example of the invention is characterized by the fact that $n$ lines of the same group ($n$ = number of grouping units), which in each case are connected to different grouping units, are combined into a line group, and a control unit examines this group with regard to its state of seizure, and that the group is rated to be free if at least one of the $n$ lines is free. In this manner it is achieved that the number of signal conductors over which each control unit examines the state of seizure of the outgoing line groups, is not higher than in the case of a single grouping unit.

The development of the coordinating circuit becomes especially simple if the controls for the path setting within the control units, upon simultaneous examination of one accepting line regarding its seizure state, are admitted for examination at each connection establishment in time succession. This form of development is suitable if the reciprocal obstruction of the control units (control units examining the same line causing each to be blocked) is sufficiently rare. In this case only one single coordinating circuit is necessary for the entire exchange installation.

However, if the reciprocal obstruction of the control units occurs more often, the circuit arrangement according to the invention is suitably developed in such a way that the coordinating circuit, at simultaneous examination within the same corresponding coupling groups of the grouping units, switches the controls for the path setting through to the lines to be examined in time succession. In this case the minimum number of required coordinating circuits corresponds to the number of coupling groups within a grouping unit.

A still higher reliability against the repetition of a path finding cycle due to a reciprocal obstruction of the control units results when the coordinating circuit, according to a further working example of the invention, forces a time spacing of the examination processes of different controls for the path setting, if these controls simultaneously scan lines which lead in the same direction.

It is also possible to develop the coordinating circuit in such a way that it forces a time spacing of the examination processes of different controls for interrogating lines, if these controls simultaneously scan one line group with *n* lines.

DETAILED DESCRIPTION OF THE INVENTION

Figure 1:
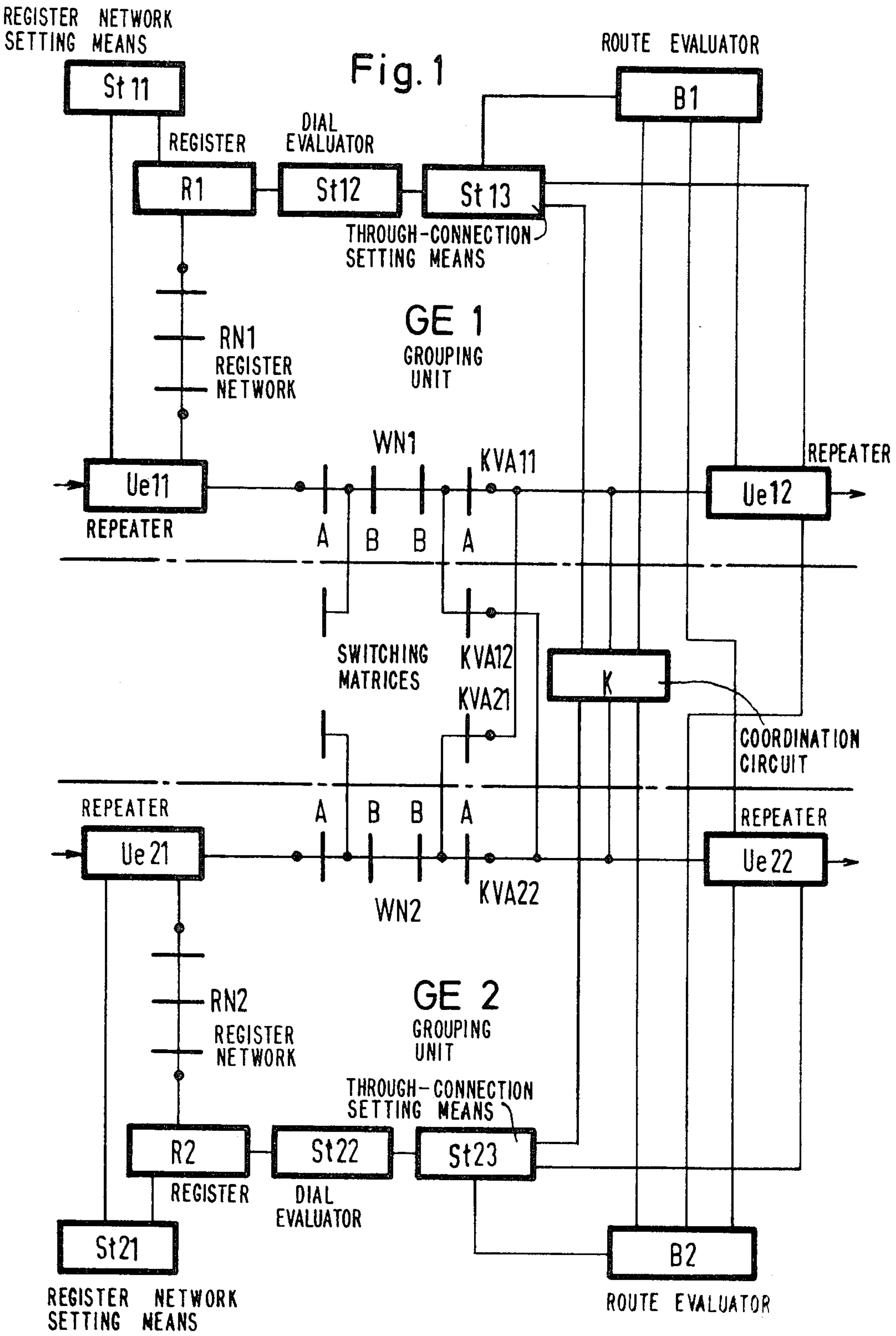
FIG. 1 is a block circuit diagram for the connection of two grouping units.

FIG. 1 shows a simplified block circuit diagram of two connected grouping units GE1 and GE2 of a teletypewriter dial exchange installation which are similar in construction. Repeaters U*e*11 and U*e*12, or U*e*21 and U*e*22 for incoming and outgoing traffic are shown separately for the sake of clarity. In reality each repeater can be seized by incoming as well as outgoing traffic. The through-connection network WN1 and WN2 is in this case developed as reversal grouping with a four-stage switching matrix. The symmetrical path network is completely neutral with regard to its connection points. The lines of a group are connected alternately to the individual grouping units. The arriving traffic is thereby divided evenly to the control units.

The arriving seized repeaters U*e*11 or U*e*12 only have access to the control unit of their grouping unit. Each control unit contains a register network-setting device S*t*11 or S*t*21 a dial evaluator S*t*22 or S*t*22, and a setting means for the through-switching of the path network S*t*13 or S*t*23, which in the following is designated as setting means for short. In addition FIG. 1 also shows registers R1 and R2 and register networks RN1 and RN2, over which the registers are connected in each case with the arriving seized repeaters. The route evaluation means B1 and B2 determine at the beginning of each exchange process the seizure condition of all outgoing lines, and communicates it to setting means S*t*13 and S*t*23. Devices for accomplishing this purpose are known, and it is contemplated that conventional route evaluation means be used (for example, see the above-referenced *Siemens Review* article). As the control unit of each grouping unit must be able to have at its disposal all outgoing lines, the route evaluation means of each grouping unit is connected with all repeaters and supplies to the setting means assigned to it, information about the seizure condition of all outgoing lines. Setting device S*t*13 or S*t*23 of each grouping unit, as well as the thereto pertaining route evaluation means B1 and B2, are connected with the coordinating circuit K. The details of the path networks WN1 and WN2 shall be explained in the following with the aid of FIG. 3.

Figure 3:
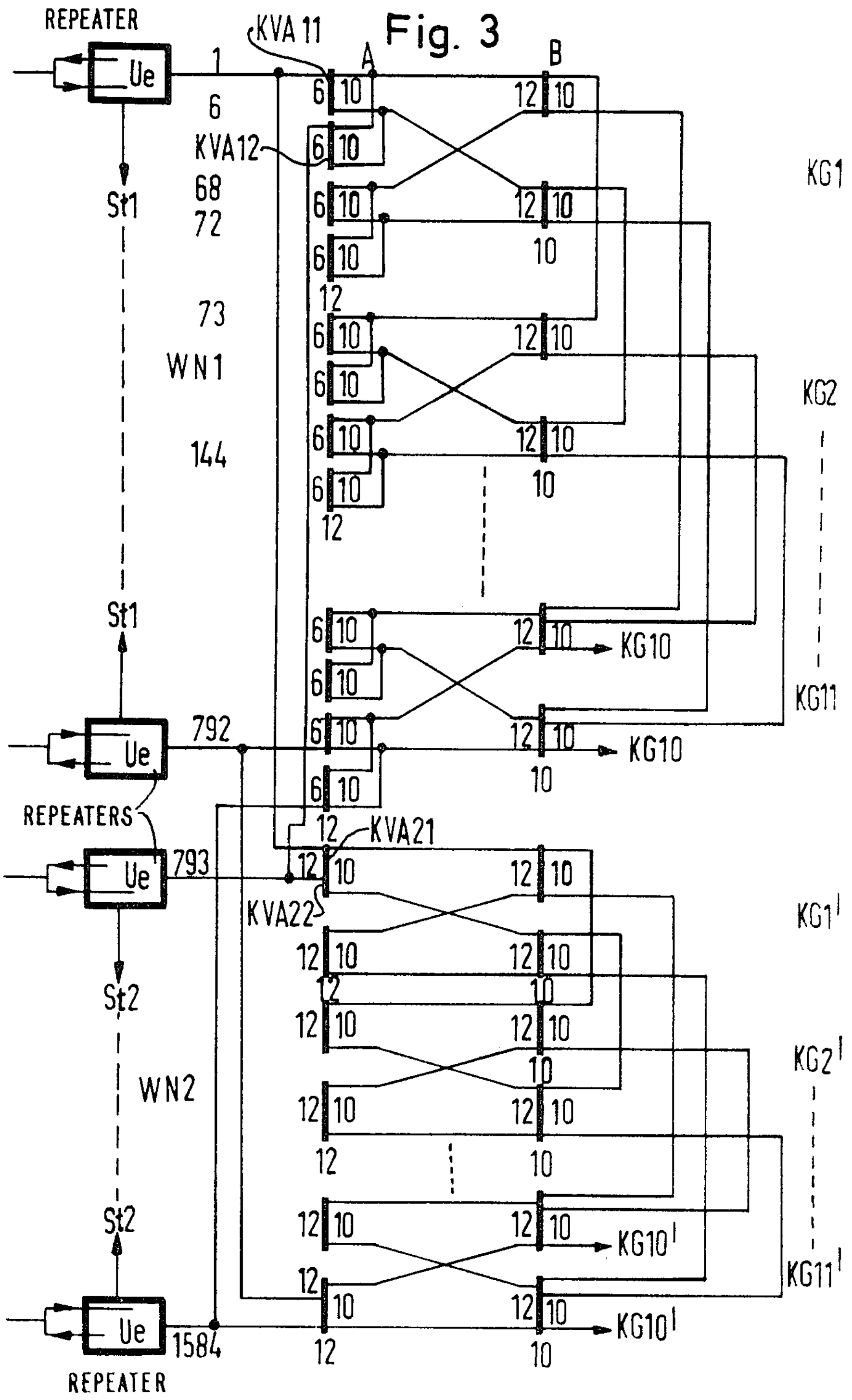
FIG. 3 shows the grouping for the connection of two grouping units with a switching matrix.

FIG. 3 shows two connected grouping units with 792 connections each. Repeaters U*e*, which can be seized in the incoming and outgoing directions, are for the purpose of connection establishment connected in each case with the thereto assigned control unit S*t*1 or S*t*2. The path networks WN1 and WN2 are each developed of 11 coupling groups KG1 to KG11, and KG1′ to KG11′ which consist in each case of an A-stage and a B-stage. In the case of a single grouping unit, A-stage of a coupling group consists of 12 coupling multiples of which each possesses six inputs and 10 outputs for intermediate lines to 10 coupling multiples of the B-stage. Correspondingly coupling multiple B has 12 inputs and 10 outputs over which the B-stages of further coupling groups are reached. Repeaters of the other grouping unit are reached over additional outputs of each coupling multiple, which are obtained by an enlargement of the coupling multiples of the A-stage by six outputs.

For example repeater 793 of grouping unit GE2 is connected, over coupling multiple KVA12, which is an enlargement of coupling multiple KVA11, to grouping unit GE1. In an exchange installation developed of *n* grouping units, there are then added accordingly (*n*–1) coupling multiples. Now two repeaters can be connected within the same coupling multiple, or within the same coupling group, or over a foreign coupling group which can pertain to the grouping unit of the arriving seized repeater, or to a different unit.

The exchange processes taking place in a grouping unit according to FIG. 1 are known per se and shall only be shown briefly here. The tasks which may have to be carried out be devices such as path-seized storage, repeater-finder, path-finder, register-finder, repeater identification means, route marker, group evaluator, converter, group marker and path network setting means, are not considered in detail, as this is not essential to the understanding of the invention.

All processes which lead to the establishment of a connection proceed at first entirely within a grouping unit. If, for example, a seizure is recognized by repeater U*e*11, register-network setting means S*t*11 is requested. The calling repeater U*e*11 is determined and a register R1, already predetermined by a not shown register finder, is marked. A free path through register network RN1 is found and the connection established between repeater U*e*11 and register R1. Register R1 focuses on the type of operation of the calling exchange office and receives the arriving dial digits. The dial evaluation is carried out by dial evaluator S*t*12. When the number of dial digits is sufficient the path through-connection program is initiated. For this purpose the seized register is first found and the thereto pertaining repeater identified. The dial evaluator determines from the dialed digits the route information and forwards this to setting means S*t*13, which marks—utilizing detour possibilities—the outgoing line group and selects a free repeater in the group.

In order that the departing line group can be determined from the route information, setting device S*t*13 must know which lines are free or seized at the moment. Thus as soon as the dial evaluator S*t*12 transmits a request to setting means S*t*13 and the path through-connection program is initiated, the thereto pertaining group supervision B1 announces all free line groups, or all such line groups combined of two departing lines, to setting means S*t*13. Thereby the control units of the grouping units are now connected with each other, as to each unit the line condition of the other grouping unit must be known in each case.

Route evaluation means B1 evaluates line groups, or line groups consisting of two lines, always as free if at least one line within the group, or the group, is free. The result of such an evaluation is communicated to the control units of all grouping units, independent from the fact as to which grouping unit the free line pertains. At first setting means St13 determines and marks with the aid of the route information, the departing line group, and selects from this line group, with the aid of the information about the connection position of the arriving seized repeater Ue11, the free line group situated most favorably to the arriving seized repeater. In the system according to FIG. 1 repeaters Ue12 and Ue22 pertain to the same group, and the group supervision reports free if either one of the two repeaters or both are not seized.

By reason of this result repeaters pertaining together can be determined for the existing seizure. Thereupon setting means St23 fixes the coupling points in the arriving seized A-stage, in the B-stages and the intermediate lines. However at this point in time it is not yet known whether the arriving seized repeater is connected with repeater Ue12 or Ue22. Only when the outgoing functioning repeater is determined can it also be ascertained whether the coupling point is to be switched through in coupling multiple KVA11, or in the enlargement of this multiple KVA12.

While the heretofore described processes, which take by far the largest portion of the time period of the program for the completion of the connection, proceed completely independent from one another in all control units, during the following testing for idleness the parallel operation of different control units must be prevented. That is, the central control unit examines thereby which of the selected repeaters Ue12 and Ue22 are still free. As, however, due to the enlarged coupling network each control unit has access to each repeater, it could happen that several of these units desire to seize the same outgoing functioning repeater at the same time. The coordinating circuit K takes care that these examinations and seizures proceed in succession.

Figure 2:
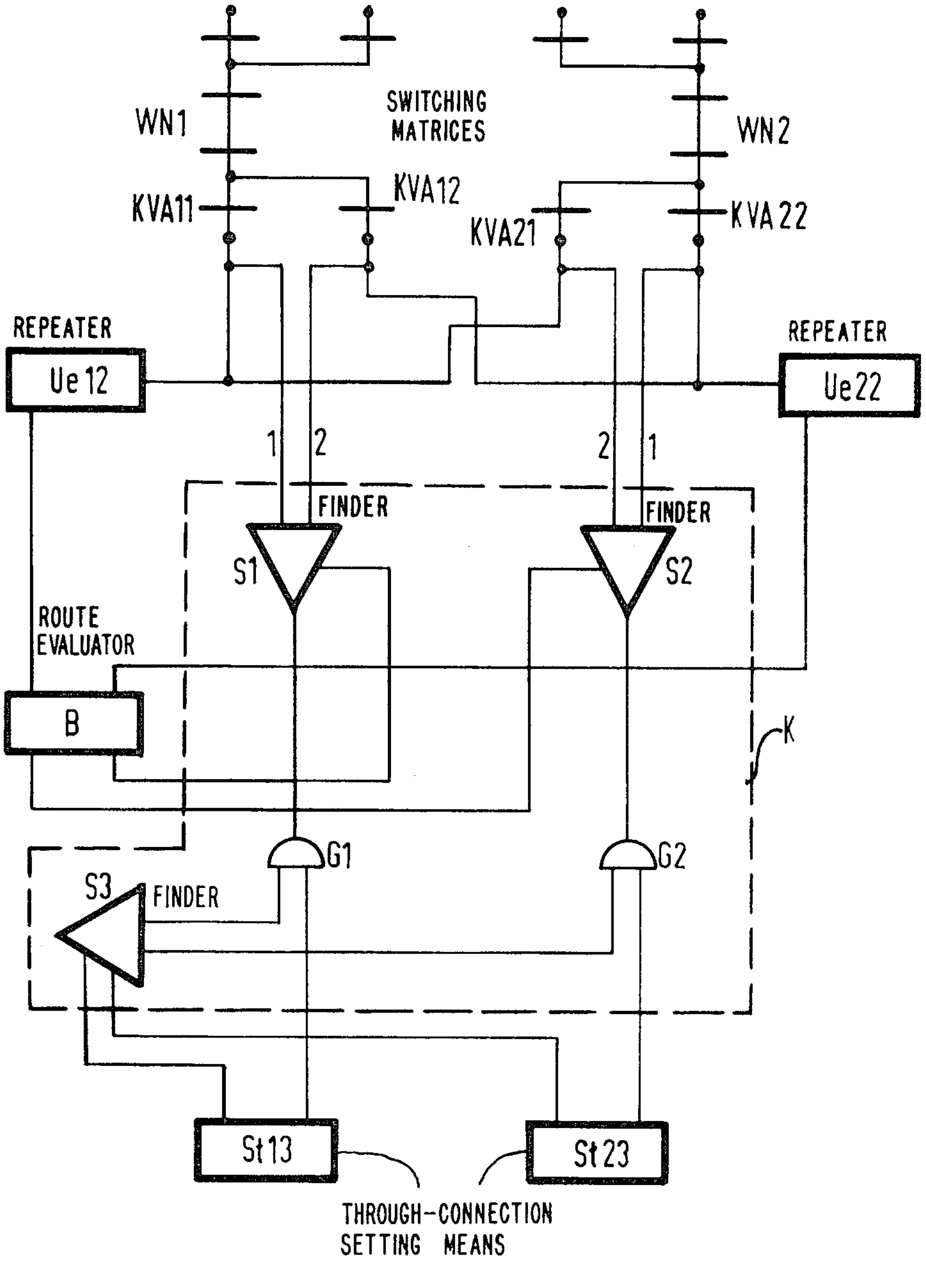
FIG. 2 is a block circuit diagram of a coordinating circuit according to FIG. 1.

FIG. 2 shows the principle of such a coordinating circuit. If setting means St13 and St23 desire to test at the same time as one of repeaters Ue12 and Ue22, they report to a finder S3 which is developed, for example, in the form of a relay finder chain. This finder decides the succession of the test. If, for example, the requests from the setting means have reached finder S3 in short succession, the first one is processed first. The setting means St13 or St23 selected by finder S3, switches its testing conductor through to a further finder S1 or S2 over coincidence gate G1 or G2. The number of coincidence gates and the thereto assigned finder, as well as of the finder outputs is thus equal to the number of setting means available.

In this case finders S1 and S2 have two outputs 1 and 2 each, of which output 1 is in each case directly connected with the output of coupling multiple KVA11 or KVA22, which is assigned to finder S1 or S2, and thereby to setting means St13 or St23, respectively. Output 2 of finder S1 or S2, however, is connected to the outputs of enlargements KVA12 or KVA21. Thus if finders S1, S2 examine outputs 1, 2 according to the succession 1, 2, there is then first selected the directly thereto assigned coupling multiple, or the repeater, which pertains to the grouping unit of the setting means assigned to them. Thus preference is always given to the repeater of the own control unit. If, for example, repeaters Ue12 and Ue22 were free, finder S1 would focus on the output of coupling multiple KVA11, and finder S2 on coupling multiple KVA22. However, if repeater Ue12 connected to output 1 of finder S1 is already seized, finder S1 will focus on coupling multiple KVA12 over its output 2, and finder S2 on coupling multiple KVA22. That output of the coupling multiple is always marked, the setting means whereof was selected by finder S3. The information as to the seizure state of repeaters Ue12 and Ue22 is received by finders S1, S2 from route evaluation means B, of which in FIG. 2 only one is shown for the sake of clarity.

The outgoing associated repeater is now seized. Following this, the already selected path is switched through the path network. After the register is set on the type of operation of the next exchange office which is to be reached, all control aggregates disconnect themselves. In addition finder S3 is released, so that the heretofore waiting setting means can hunt. The further establishment of the connection is carried out by the register, which itself disconnects from the connection path after having conveyed the dial information to the next exchange office.

It can now happen that during an exchange process the route evaluation has found a group, or a line group, to be free, and that this was noted by the setting means. However, while the program proceeded, the last free repeater within this group, or line group, was seized by the control unit of another grouping unit. Therefore the exchange attempt cannot be completed. In this case a new exchange attempt is initiated by the setting means so that the load of the setting means, but not the traffic losses, are increased. The probability for the occurrence of a new path finding cycle is so slight, however, that the load of the setting means practically does not change.

Figure 4:
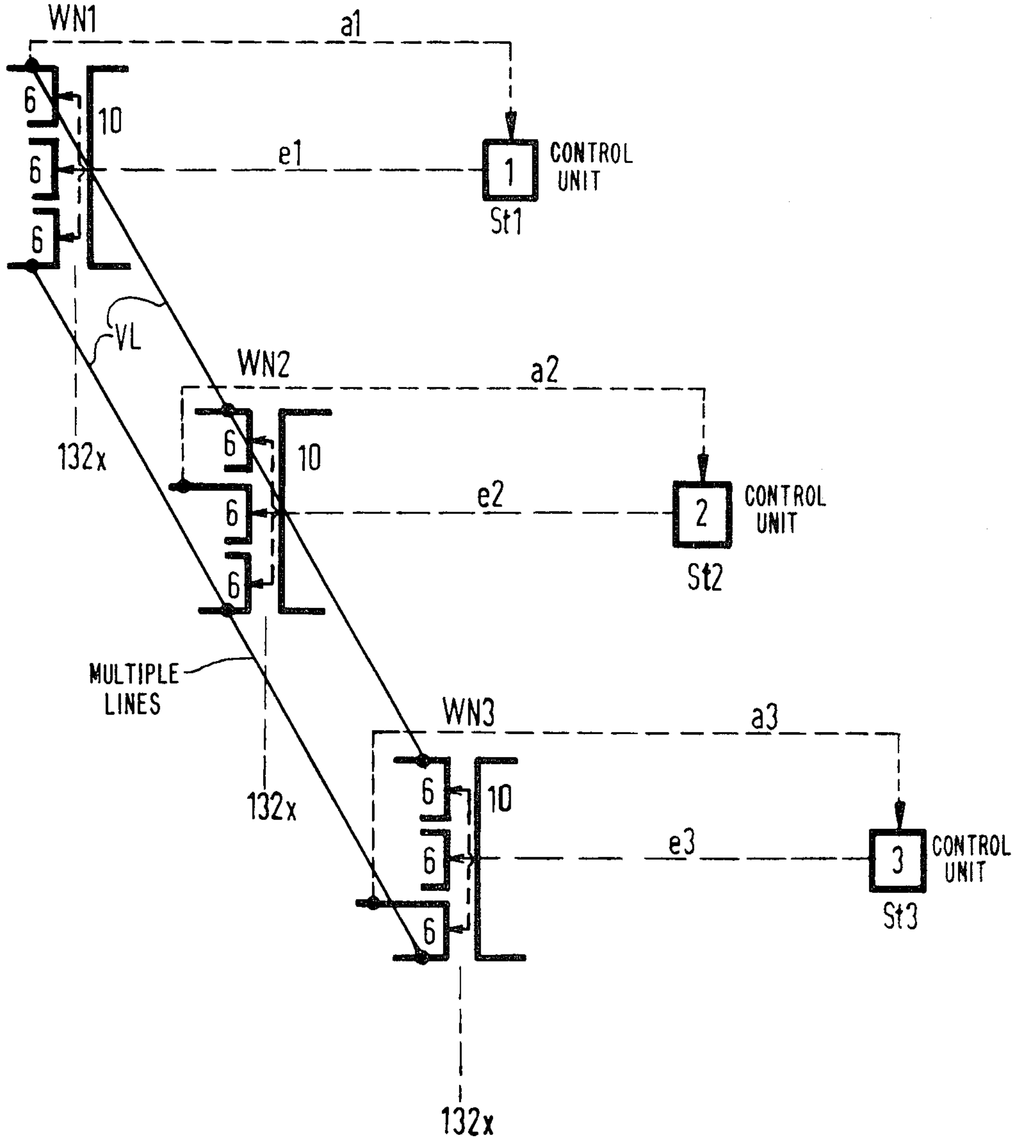
FIG. 4 shows the multiple switching of three grouping units over enlarged multiples of the through-connection network.

The coordinating circuit for two grouping units is, of course, to be enlarged accordingly if the exchange office is developed for more than two, for example, three, grouping units. The multiple circuit of such an exchange office developed for three grouping units is shown in FIG. 4. The A-stages of the path networks WN1, WN2 and WN3 have in each case been enlarged by two coupling multiples with six inputs and 10 outputs each. The entire arriving traffic is divided into three partial groups, which is conducted in path network WN1 in each case to the first coupling multiple, in path network WN2 in each case to the second coupling multiple, and in path network WN3 in each case to the third coupling multiple. These said coupling multiples have, in each case over the excitement lines for the arriving traffic a1, a2 and a3, access to the control unit St, St2 and St3 assigned to them. The setting of the departing lines can take place over setting lines e1, e2 and e3. Thereby each control unit can carry out settings in its own grouping unit or over the here only suggested multiple lines in the other grouping units.

We claim:

1. A long distance communication teletypewriter dial exchange installation wherein the establishment of a connection is centrally controlled comprising:

a plurality of line grouping units (GE), each having a through-connection network (WN), connection establishment systems, and a control unit, the lines of the plurality of grouping units being connected thereto in even distribution, each control unit, operating independent from the control units of other grouping units, being operative to connect through the lines assigned to it over multiple lines (VL) between the through-connection networks and all receiving lines of every other grouping unit, and at least one coordinating circuit (K) to prevent the multiple seizure of outgoing lines and determine the succession sequence during testing for the seizure state of receiver lines by several simultaneously requesting control units.

2. A long distance installation as recited in claim 1 wherein, the through-connection networks comprise switching matrices, coupling stages having coupling multiples connected with the receiver lines being sufficient in number such that the number of coupling points per coupling multiple is increased by the factor *n*, when there are *n* grouping units, the corresponding outputs of the switching matrices being connected over multiple-lines.

3. A long distance installation as recited in claim 1 wherein, the through-connection networks comprise switching matrices, the coupling multiples of the coupling stages of the coupling groups of each switching matrix directly connected to the lines being sufficient so that the number of coupling points per coupling multiple is increased by the factor *n*, where *n* is the number of grouping units, the corresponding connections of the switching matrices being connected over multiple lines.

4. A long distance installation as recited in claim 1 wherein $n$ lines of the same group, where $n$ is the number of connected grouping units, which in each case are connected to different grouping units (GE), are combined into a line group, means in a control unit for testing the line group with regard to its state of seizure, the line group being reported free if at least one of the $n$ lines is free.

5. A long distance communication installation as recited in claim 3 wherein the coordinating circuit includes means for causing a time spacing of the testing processes of different controls for the path setting, when the controls simultaneously scan lines leading in the same direction.

6. A long distance communication installation as recited in claim 4 wherein the coordinating circuit includes means for causing a time spacing of the testing processes of different controls on a receiver line, if the controls simultaneously scan a line group with $n$ lines.

7. A long distance installation as recited in claim 1 wherein each said control unit includes a path setting means (St13, St23) and further comprising:

means in said coordinating circuit for controlling said path setting means so that simultaneous attempts at testing receiver lines for their state of seizure will be caused to occur in time succession.

8. A long distance installation as recited in claim 1 wherein each said control unit includes a path setting means (St13, St23) and further comprising:

means in said coordinating circuit for controlling said path setting means so that simultaneous attempts at testing coupling groups of grouping units will be caused to occur in time succession.

9. A long distance installation as recited in claim 1 wherein a control for path setting effects a new through-connection to another outgoing line if the outgoing line selected by it has been seized by another control during the program of path through-connection.

10. A long distance installation as recited in claim 3 wherein the coordinating circuit (K) comprises for $n$ connected setting means (St13, St23) a first finder (S3) with $n$ inputs and $n$ outputs for the selection of one among several simultaneously requesting setting means, and $n$ further finders (S1, or S2), each of which is assigned to a setting means St13 or St23).

the further finders each having an associated coincidence gate (G1, G2), the inputs of the latter being connected to an output of the first finder and an output thereof being connected to the thereto pertaining setting means (St13, St23).

the further finders (S1, S2), each also having $n$ outputs (1, 2), of which that first tested in each case in a finding process (1) is connected with an output of the coupling multiple (KV11, KV22) assigned to the corresponding one of the further finders (S1, S2) and that tested (2) in the $k^{th}$ place ($k$=2) being connected with an output of the $k^{th}$ enlargement (KVA12, KVA21).

* * * * *